July 13, 1948. R. F. STAMM ET AL 2,445,044
DIFFERENTIAL REFRACTOMETER
Filed Nov. 9, 1945 2 Sheets-Sheet 1
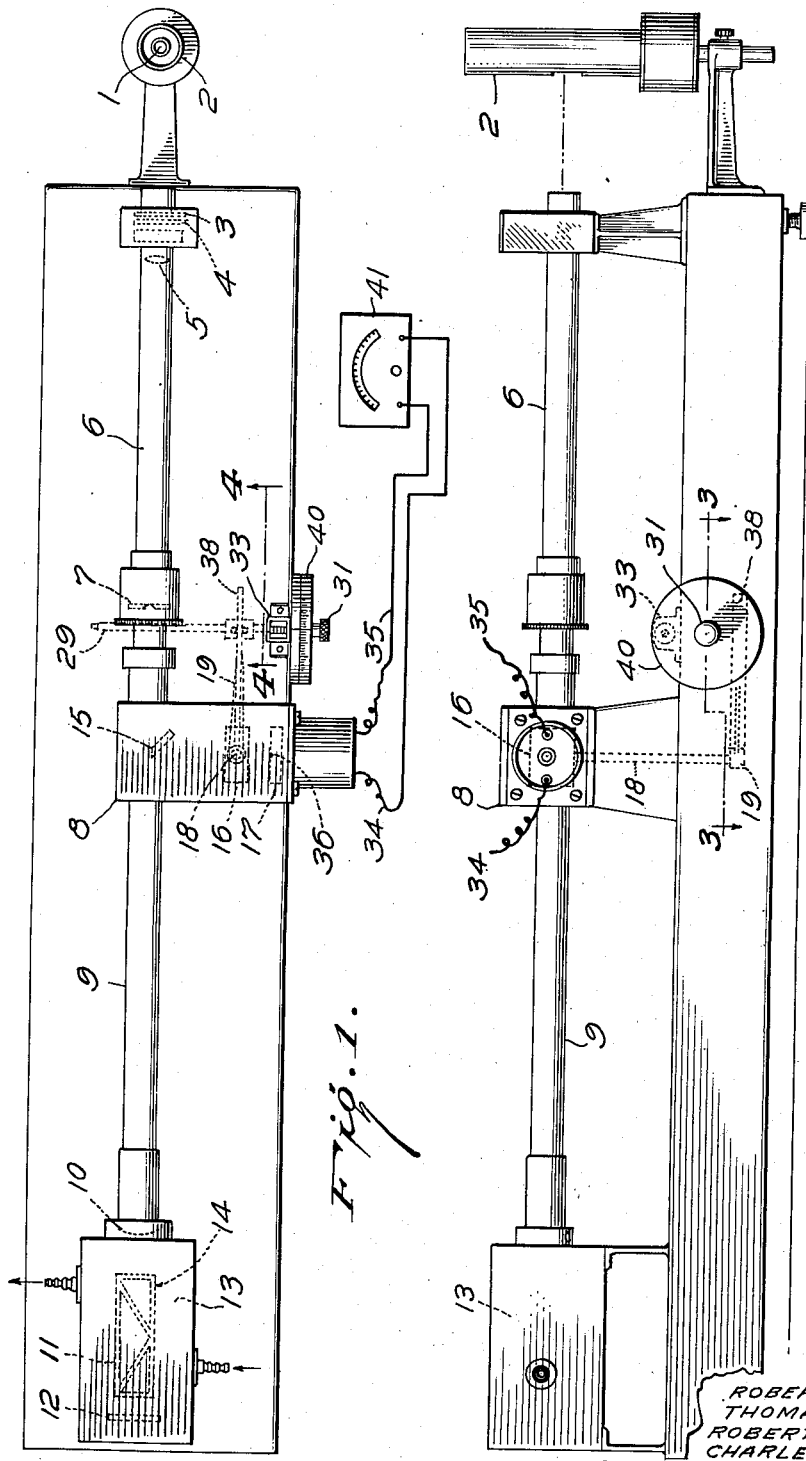
INVENTORS
ROBERT F. STAMM,
THOMAS MARINER,
ROBERT B. BARNES,
CHARLES R. STRYKER,
BY
ATTORNEY July 13, 1948.  R. F. STAMM ET AL  2,445,044
DIFFERENTIAL REFRACTOMETER
Filed Nov. 9, 1945  2 Sheets-Sheet 2
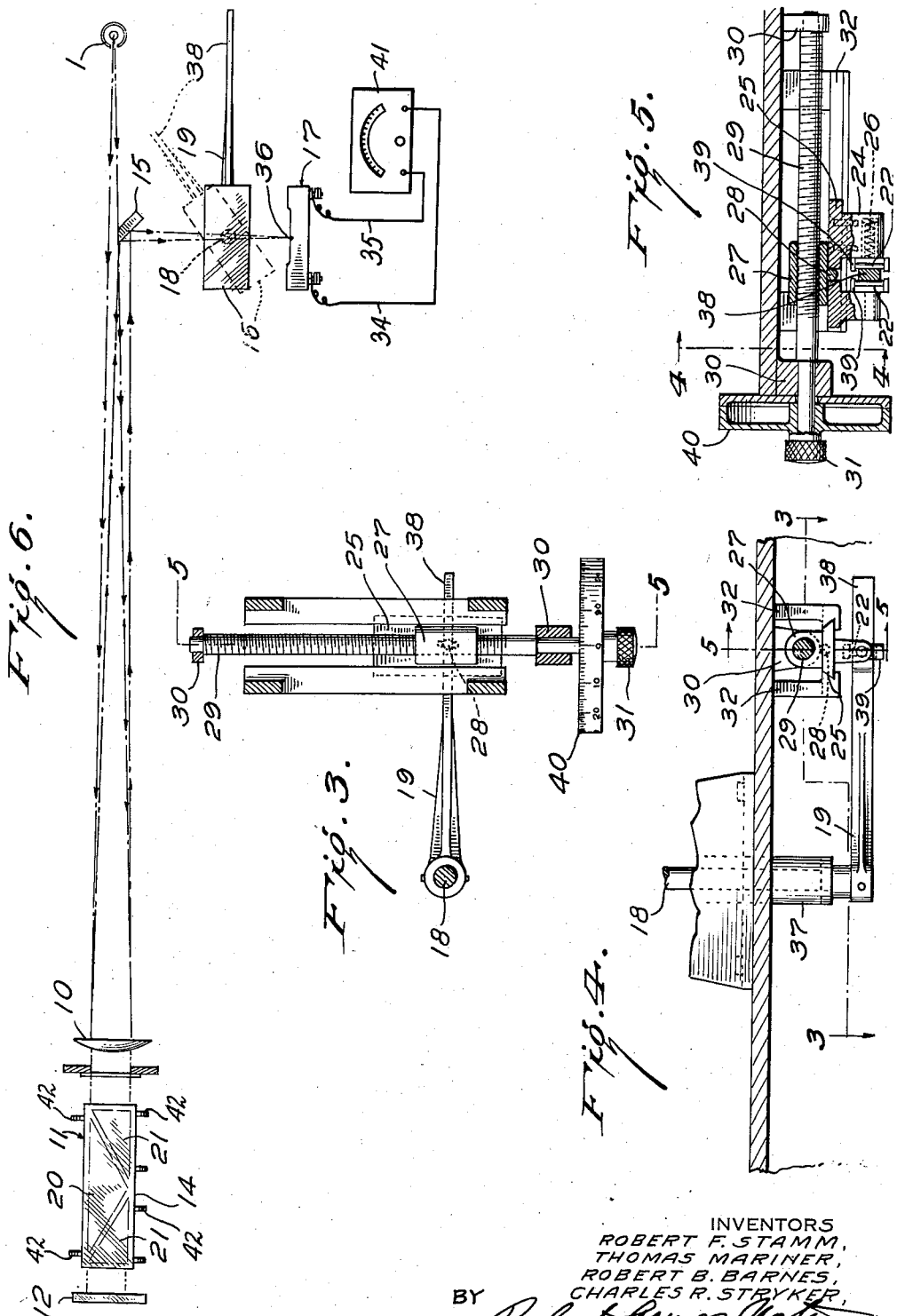
INVENTORS
ROBERT F. STAMM,
THOMAS MARINER,
ROBERT B. BARNES,
CHARLES R. STRYKER,
BY
ATTORNEY Patented July 13, 1948

2,445,044

UNITED STATES PATENT OFFICE 2,445,044

DIFFERENTIAL REFRACTOMETER

Robert Franz Stamm, Stamford, Thomas Mariner, South Norwalk, Robert Bowling Barnes, Stamford, and Charles Rule Stryker, Greenwich, Conn., assignors to American Cyanamid Company, New York, N. Y., a corporation of Maine Application November 9, 1945, Serial No. 627,638

5 Claims. (Cl. 88—14)

This invention relates to an improved differential refractometer.

It is often important to measure differences of refractive index of two solutions. For example, the problem is presented when changes in refractive index must be known in order to determine molecular weight by means of light scattering. It is necessary to measure changes in refractive index to the fifth decimal place and it is desirable to measure to the sixth, if possible. Expensive and complicated instruments such as those operating on interferometric principles are used, such as a Rayleigh differential refractometer. Most of these instruments require visual matching of interference fringes by a skilled operator. The procedure is tiring and accuracy depends on the operator, thus making the instrument subjective in its method of operation.

The present invention is directed to a much simpler and more rugged instrument which is capable of comparable accuracy and is objective in its method of operation. The essential optical arrangement of the present instrument provides a monochromatic beam from a suitable slit placed at the principal focus of a collimating lens which renders the light parallel before it is passed through three prisms in series, with dispersions opposed, reflected by a mirror, and again passed through the same three prisms and finally imaged by the same lens on a split photoelectric device with a minute central dividing line between the two halves. The three prisms are liquid prisms preferably arranged in a manner similar to a Wernicke prism, with one liquid in the middle prism and the other liquid or solution in the two end prisms. In such an optical system, a small difference in refractive index existing between the liquid in the central prism and the liquid in the two end prisms will cause an angular shift of the beam traversing the prism system. The sine of the angle is proportional to the refractive index difference and for small angles, the angle itself can replace the sine. With a fixed slit source of light, the lateral displacement of the image of the slit will be proportional to the refractive index difference. The two halves of the photoelectric device are connected to a differential galvanometer of conventional design or to the input of a differential electronic amplifier when amplified readings are desired.

The most accurate use of the apparatus is as a null instrument. In other words, an instrument in which the photocell or similar split radiation detector is brought back to the point where the slit image is on the scratch or dividing line between the two halves. The amount of movement of the photocell would then be a measure of the change in refractive index. In order to be able to read this change with an accuracy in the sixth decimal place, the motion would have to be accurate to 0.00035 cm. with the optical system of a typical model with a 50 cm. focal length lens system and a 120° central prism. Such an accuracy is possible with the finest micrometer screws but presents a serious problem in machine design. It is not excluded from the broader scope of the present invention but we prefer a different and more rugged modification. The preferred modification proceeds on the proposition that the measurement is displacement of the slit image with respect to the dividing line of the split radiation detector. Since we are concerned only with relative motion it makes no difference whether the image is moved and the photocell remains still, or whether the image remains still and the photocell is moved.

A very accurate method of producing a lateral displacement of the image is to pass the beam through a parallel glass plate with optically flat surfaces, which plate can be rotated about an axis at right angles to the beam. The lateral displacement of the image produced by passing through a parallel plate of this type is substantially proportional to the tangent of the angle through which the plate is turned for angles up to 35°, and by using a suitable lever arm a very accurate device can be produced which requires a micrometer screw of only moderate fineness and presents no serious machine design problems. This modification is therefore preferred and will be described in detail in conjunction with the drawings, in which:

Fig. 1 is a plan view of a complete refractometer;

Fig. 2 is a side elevation;

Fig. 3 is an enlarged detailed sectional view along the line 3—3 of Figs. 2 and 4;

Fig. 4 is a vertical detailed section along the line 4—4 of Figs. 1 and 5;

Fig. 5 is a vertical section along the line 5—5 of Figs. 3 and 4; and

Fig. 6 is a diagram of the optical path through the instrument from slit to photocell.

The instrument is provided with a source of illumination, preferably a high pressure mercury arc 1, in a suitable housing 2, supported by the main framework of the instrument. Light from the arc passes through a small window in the housing into a tube 6 provided with an enlarged portion which carries filters 3 and 4 to absorb radiation except in one of the lines of the mercury arc, preferably the green line of wave length 5461 A.

The monochromatic radiation leaving the filters passes through a lens 5 which images the arc on a slit 7. The beam from the slit passes on through a second tube 9 provided with a box-like enlargement 8 and a planoconvex lens 10 at its end. This lens transforms the beam into parallel light which passes through a triple prism 10 consisting of a central prism 20 and two end prisms 21, strikes a mirror 12 and is reflected back through the prisms. The prisms are provided with inlets and outlets 42 which permit introducing any desired liquid into any one of the three prisms. Any difference in refractive index between the fluid in prism 20 and the fluid in prisms 21 will produce a deviation of the beam after it has been reflected back through the prisms. This deflected beam strikes a mirror 15 in enlargement 8 and is reflected through a transparent plate 16 onto a split photocell 17 provided with a very narrow dividing scratch 36 (Figs. 1 and 6). The position of the photocell is such that the slit 7 is accurately imaged in the plane of the photocell surface. This requires a slightly longer path from the mirror 12 to the photocell 17 than from the slit 7 to the mirror, because of the effect of the beam passing through the plate 16.

The two halves of the photocell are connected through wires 34 and 35 to a differential conventional galvanometer of conventional design 41. They may, of course, be connected to any other suitable differential voltage indicator or recorder. The construction of indicators and recorders forms no part of the present invention, but it is an advantage that conventional devices may be used without modification. Since the two halves of the photocell are connected so that the currents oppose each other, the instrument will read zero when the image is substantially centered on the scratch. When the sensitivities of the two halves are exactly equal, the null reading will result when the slit image is exactly centered on the scratch. If, as may occur, the two photocell halves differ slightly in sensitivity, the null reading will occur when the slit image is substantially centered but not exactly, there being slightly more illumination on the photocell half having the lower sensitivity.

The plate 16 is mounted on a shaft 18 centered where the beam is located at zero deflection. This shaft extends down through a bearing 37 in the bottom of the main framework of the machine (Fig. 4). On its bottom end there is clamped a rigid arm 19 provided with a thin shoe 38 at its end made of Stellite or other hard material. Two Stellite pins 22 in yokes 39 bear against the two sides of the Stellite shoe. These yokes fit in recesses in a block 24 rigidly fastened to a carriage 25 which moves horizontally in guides 32 attached to the main framework of the machine (Fig. 4). One of the yokes 39 presses against a spring 26 in the recess so that the pins are always in close but slidable contact with the Stellite shoe at the end of the arm 19. The details of this portion of the device are shown in Fig. 5.

The carriage 25 is provided with a depression directly above the pins 22 in which there is a hardened steel ball 28 which projects into a corresponding depression on a threaded sleeve 27 through which a micrometer screw 29 passes. This screw is mounted in bearings 30 and carries at its end a dial 40 and a knob 31. The micrometer screw is of 1 mm. pitch, making 70 revolutions for a 7 cm. travel.

It will be noted that when the screw 29 is turned the arm 19 is moved and the plate 16 is rotated. The linear movement of the carriage 25 is therefore proportional to the tangent of the angle through which the plate 16 is turned. A small difference in refractive index existing between the liquid in the center prism and the liquid in the two outer prisms will produce a lateral displacement of the image proportional to refractive index difference. The parallel plate, when inclined to the beam, will produce an equal and opposite lateral displacement which is proportional to the tangent of the angle of plate inclination. Consequently, this tangent arm reads a quantity directly proportional to refractive index difference. Changes in refractive index are therefore proportional to the revolutions of the micrometer screw 29, and hence can be read on the dial 40. Because a large number of revolutions will normally be needed, a revolution counter 33 is provided which is of conventional design. The dial 40 has graduations which permit reading to the sixth decimal place when the total length of beam travel from slit 7 to mirror 12 is about 50 cm. and the length of arm 19 is about 10 cm.

Before the apparatus is operated it is calibrated by putting the same liquid in the three prisms and adjusting the mirrors until the beam image is on the dividing line between photocell halves as indicated by a null reading. Then two liquids of known refractive index difference are used in the prism assembly and the plate is rotated to produce the same null reading. The two readings suffice to calibrate the dial so that it reads a quantity directly proportional to refractive index difference. The instrument does not ordinarily change during use as good thermostatting is effected by having the prism enclosed in a housing 14 which is in turn in a thermostatic bath 13.

If desired the photocell may be moved with a very fine micrometer screw instead of using the plate 16, but this modification is less accurate unless a micrometer screw of extraordinary fine pitch is used.

In the claims the term "indicating means" will be used in a generic sense to include means which indicate and record and also means which indicate only.

In the drawings, there has been illustrated a comparatively narrow slit as a source of the monochromatic light beam. The use of a moderately narrow slit presents some advantages from the standpoint of sharpness of the null reading on the indicating device, however, it is not essential that a narrow slit be used as the source. Any shape of source which will give a sharp image symmetrical with respect to a center line imageable on the gap between photoelectric devices is usable because a null reading can be obtained even though a substantial portion of both halves of the photoelectric device are illuminated provided the distribution of area of the image is symmetrical. Change in indicator reading on approach to the null point is of maximum sharpness with a narrow slit, the image of which is only a little wider than the gap or scratch dividing the two sides of the photoelectric device and this is therefore the preferred modification of the present invention although it is not limited thereto.

We claim:
1. A differential refractometer comprising in combination and in optical alignment a source of monochromatic light, a triple prism of the Wernicke type, consisting of two end prisms and a center prism, the prisms being provided with means through which liquid may be introduced, a mirror behind the triple prism positioned to reflect the beam passing therethrough back through the prism at a slight angle from the beam incident on the prism, a photoelectric device having a sharply bounded sensitive area, means for forming a sharply focused image of the source on the plane of the photoelectric device with a boundary line parallel to the boundary line of the photoelectric surface, an electrical current indicator associated with said photoelectric device, adjustable means spaced from the Wernicke prism for producing relative movement between the photoelectric device and the image of the source across said boundaries and quantitative indicating means actuated by said means for producing relative movement.

2. A differential refractometer comprising in combination and in optical alignment a slit source of monochromatic light, a triple prism of the Wernicke type, consisting of two end prisms and a center prism, the prisms being provided with means through which liquid may be introduced, a mirror behind the triple prism positioned to reflect the beam passing therethrough back through the prism at a slight angle from the beam incident on the prism, a split photoelectric device having sensitive areas separated by a straight, narrow gap, means for forming a sharply focused image of the slit source on the plane of the photoelectric device with a boundary line parallel to the gap, current indicating means associated with said split photoelectric device connected to the two sensitive areas in opposition and capable of giving a null reading when the slit is substantially imaged on the gap separating the sensitive areas of the photoelectric device, adjustable means spaced from the Wernicke prism for producing relative movement across the gap between the photoelectric device and the image of the slit, and quantitative indicating means actuated by said means for producing relative movement.

3. A differential refractometer comprising in combination and in optical alignment a slit source of monochromatic light, a triple prism of the Wernicke type, consisting of two end prisms and a center prism, the prisms being provided with means through which liquid may be introduced, an autocollimating mirror behind the triple prism positioned to reflect the beam passing therethrough back through the prism, at a slight angle from the beam incident on the prism, a split photoelectric device having sensitive areas separated by a narrow straight gap, means including said mirror for forming a sharply focused image of the source on said gap, a transparent plate having front and rear surfaces parallel to each other in the path of the reflected beam between the prism and the split photoelectric device, this transparent plate being rotatable about an axis which is at right angles to the reflected beam and parallel to the gap and substantially passes through the optical axis of said beam when the source is imaged on the gap, indicating means associated with said split photoelectric device connected to the two current sensitive areas in opposition and capable of giving a null reading when the slit is substantially imaged on the gap separating the sensitive areas of the photoelectric device, means for rotating the transparent plate to deflect the image of the source at right angles to the gap separating the sensitive portions of the photoelectric means, and indicating means associated therewith and capable of measuring a quantity proportional to the amount of deflection of the source image.

4. A device according to claim 3 in which the indicating means associated with the means for rotating the transparent plate gives an indication proportional to the tangent of the angle through which the plate is rotated, said means comprising an arm capable of rotating the plate about its axis, and micrometric means slidably attached to said arm and capable of linear movement in a direction such that the linear movement is proportional to the tangent of the angle of rotation of the plate and measuring means for indicating the extent of said movement.

5. A device according to claim 3 in which the transparent plate is mounted on a shaft provided with a rigidly mounted arm 19 extending at right angles thereto, a rigid framework at right angles to the shaft and defining with the movable arm the adjacent side and hypotenuse of a right triangle, a micrometric screw 29 slidably engaging the arm and constituting the third side of the right triangle opposite the variable angle and an indicator for indicating revolutions of said micrometric screw.

ROBERT FRANZ STAMM.
THOMAS MARINER.
ROBERT BOWLING BARNES.
CHARLES RULE STRYKER.

REFERENCES CITED

The following references are of record in the file of this patent:

UNITED STATES PATENTS

| Number | Name | Date |
|---|---|---|
| 830,225 | Haber | Sept. 4, 1906 |
| 1,471,342 | Logan | Oct. 23, 1923 |

FOREIGN PATENTS

| Number | Country | Date |
|---|---|---|
| 11,200 | Great Britain | 1905 |